United States Patent [19]

Liu

[11] Patent Number: 5,453,107
[45] Date of Patent: Sep. 26, 1995

[54] AIR AND GAS COOLING AND FILTRATION APPARATUS

[75] Inventor: Benjamin Y. H. Liu, North Oaks, Minn.

[73] Assignee: MSP Corporation, Minneapolis, Minn.

[21] Appl. No.: 198,125

[22] Filed: Feb. 17, 1994

[51] Int. Cl.$^6$ .................................................. B01D 47/00
[52] U.S. Cl. .................... 55/255; 55/257.6; 55/259; 55/267; 95/226; 95/228
[58] Field of Search ........................ 55/248, 250, 255, 55/256, 257.6, 259, 267, DIG. 30; 95/156, 214, 226, 228

[56] References Cited

U.S. PATENT DOCUMENTS

| | | | |
|---|---|---|---|
| 652,773 | 7/1900 | Hirt | 55/255 |
| 3,210,914 | 10/1965 | Eckert | 55/90 |
| 3,353,799 | 11/1967 | Lions et al. | 261/3 |
| 3,566,583 | 3/1971 | Ashmore | 55/255 |
| 3,596,339 | 8/1971 | Moragne | 55/233 |
| 3,608,280 | 9/1971 | Martin | 55/255 |
| 3,695,005 | 10/1972 | Yuzawa | 55/255 |
| 3,856,487 | 12/1974 | Perez | 55/223 |
| 3,984,219 | 10/1976 | Huang | 55/255 |
| 4,432,777 | 2/1984 | Postma | 55/255 |
| 4,460,552 | 7/1984 | Zakrzewski | 423/210 |
| 4,957,519 | 9/1990 | Chen | 55/233 |

Primary Examiner—C. Scott Bushey
Attorney, Agent, or Firm—Westman, Champlin & Kelly

[57] ABSTRACT

An apparatus for handling exhaust gases, such as diesel exhaust, which cools the exhaust gases as the gases exit a diesel engine, and then filters such gases to remove particulate material. A housing has an inlet pipe with perforations and a filling of a liquid through which gas bubbles as it exits the perforations in the inlet pipe. The gas bubbling through the liquid cools the gases. In order to maintain the bubbles at a desired size, a perforated or porous layer of material is provided in the liquid so that gas moves through the perforated layer before it exits the liquid. Preferably the gas exiting the liquid is then passed through a filter which is maintained in a wet condition by mist carried by the gases that is formed as the gases burst through the surface of the liquid. The fibers of the filter are maintained wetted so that particles of material do not adhere to the fibers and can be flushed therefrom.

12 Claims, 2 Drawing Sheets

5,453,107

AIR AND GAS COOLING AND FILTRATION APPARATUS

CROSS REFERENCE TO RELATED APPLICATION

Reference is made to earlier filed application of Benjamin Y. H. Liu entitled METHOD AND APPARATUS FOR AIR AND GAS FILTRATION, Ser. No. 08/089,942, filed Jul. 12, 1993, now abandoned. The present application is assigned to the same assignee, MSP Corporation, as the above-referenced application.

BACKGROUND OF THE INVENTION

The present invention relates to an apparatus for cooling and filtering exhaust and other gases, by first bubbling the gas through a liquid and controlling the bubble size so that efficient cooling occurs. When the bubbles burst from the surface of the liquid, they create a mist that the gas carries through a long mist as they pass through an exit filter. The mist is sufficient to keep the fibers of the filter wet to prevent particulate contaminants from tightly adhering to the filter fibers.

Diesel engines in enclosed spaces such as underground mining operations are a source of contaminants that raise concern about human health when inhaled. Current filters utilize fibrous materials, but a problem occurs when the exhaust is saturated with water vapor, which may then condense in the filter causing the filter to become partially clogged. This increases the resistance to the gas flow through the filter leading to an excessive pressure drop through the filtering equipment. Another problem is that a bond is often formed between the particulate materials removed from the exhaust gas and the filter fibers themselves, causing the particles to tightly adhere to the filter fibers and making it difficult to remove the particles from a clogged filter. Cooling the exhaust and providing a filtration apparatus acting as a muffler, while removing particulate materials is desired. In enclosed environments, such as mines, the problems with diesel exhaust remain substantial.

SUMMARY OF THE INVENTION

The present invention provides an apparatus for cooling and filtration of exhaust and other gases that reduces the incident of particles removed from the exhaust from interfering with the operation of the filter, and provides a highly efficient gas cooling device. The apparatus is greatly simplified by providing a liquid bath for a perforated inlet pipe through which the gas bubbles as the gas passes from an inlet chamber to an outlet chamber of a housing. The size of the bubbles is controlled by passing the exhaust through a relatively coarse screen assembly, which is submerged in the liquid, to maintain the bubbles relatively small, and permitting such small bubbles to pass through the liquid before bursting through the surface. As the bubbles burst from the surface of the liquid, a mist is created, which is carried with the gas through a subsequent filter, if desired, and the quantity of mist is sufficient to wet the fibers used in the filter so that particulate material does not tightly adhere to the fibers, but rather is carried with the liquid as it is separated from the gas.

As shown, the filtration apparatus comprises a housing having a lower inlet chamber filled with the liquid, and a pipe that is perforated in the bottom of the chamber. The exhaust or other gas that is to be cooled and filtered is passed through the pipe, and out through the perforations in the pipe so that the gas bubbles into the liquid, (preferably water or water containing a detergent) and then as the bubbles rise in the liquid, they pass through a screen or porous layer that also is submerged so the bubbles are broken up into smaller bubbles which then rise to the surface of the liquid. The bubbles burst as they pass across the liquid surface, and create a mist that is carried with the gas through a fibrous filter into an outlet chamber. The volume of gas in relation to the housing size is maintained such that the mist created is sufficient to cause the fibers of the outlet filter to be wetted by the mist and thus prevent the contaminants from tightly adhering to the fibers. The fibers are wetted sufficiently so that they do not tend to clog, and the particulate materials will be drained off the fibers with the liquid. There is a sufficient quantity of water on the fibers so that there is a constant draining.

The gas exiting the fibrous filter then passes through a conventional demister to remove any remaining mist carried by the gas before being discharged in a clean and cool condition back into the environment, such as a mine atmosphere.

If desired, the outlet filter can be periodically flushed to provide a higher flow of water to remove accumulated particles and liquid from the fiber filters. The flushing can be at regular intervals of time, or in response to a pressure drop across the filter. A suitable drain is provided to remove particles and water from the outlet filter.

Ideally, however, the size of the outlet filter, the size of the housing, and the volume of gas are coordinated such that the bubbles bursting from the surface of the liquid carry a sufficient mist to maintain an adequate layer of liquid on the outlet filter fibers and also provide for a draining action to insure that the filter does not clog because of particulate materials adhering to the fibers.

A wide variety of filter arrangements can be used, for example those shown in my above-mentioned application Ser. No. 08/089942, filed Jul. 12, 1993, the fibers can be made of a variety of materials such as glass, metal, minerals, and other materials.

The liquid used is generally water or water containing a desired detergent that will provide for a cleaning action on the filter fibers.

It may also be desirable to use a liquid that acts as a solvent for the particles removed from the exhaust gas.

DETAILED DESCRIPTION OF THE PREFERRED EMBODIMENTS

Figure 2:
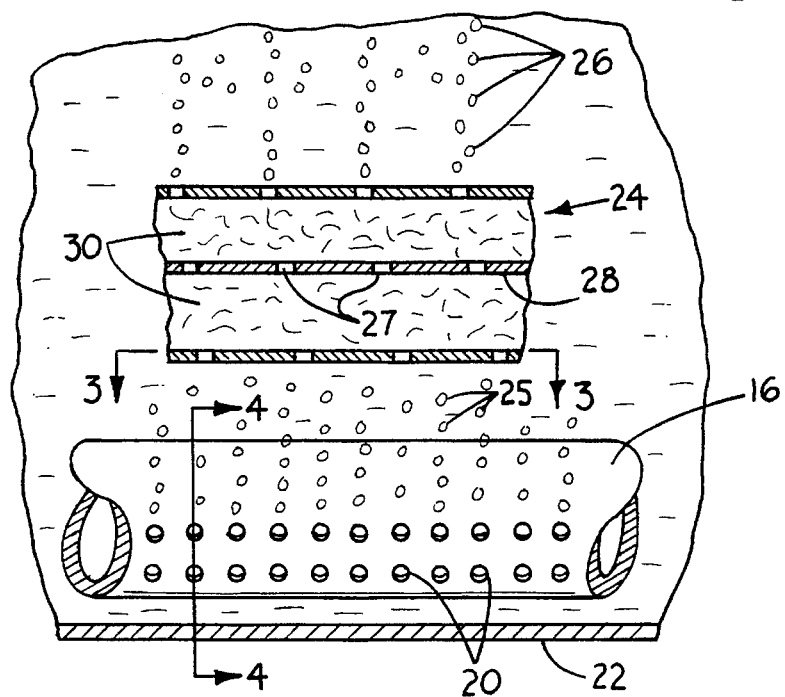
FIG. 2 is an enlarged fragmentary side sectional view of the inlet chamber of the present invention showing a screen or porous layer through which gas bubbles pass before reaching an outlet filter of the present device.
Figure 3:
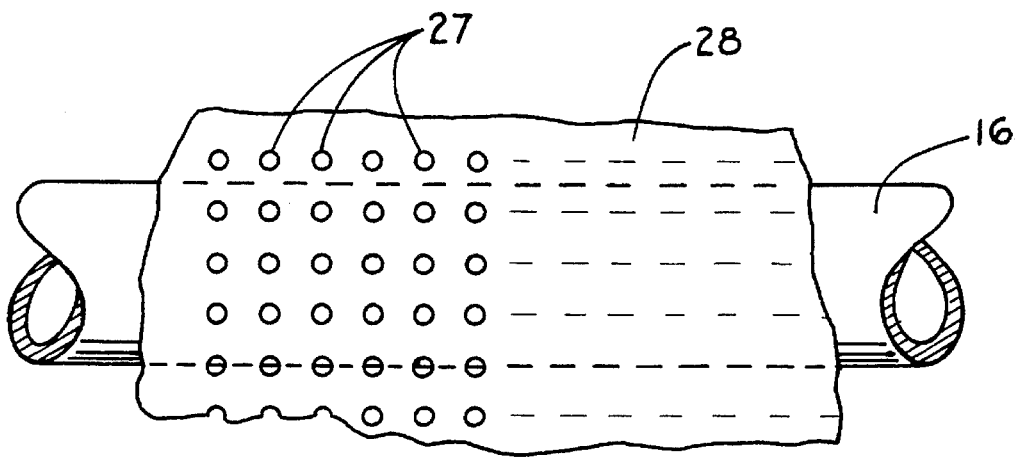
FIG. 3 is a fragmentary sectional view taken on line 3—3 in FIG. 2 illustrating a typical perforated plate used in the present invention.
Figure 4:
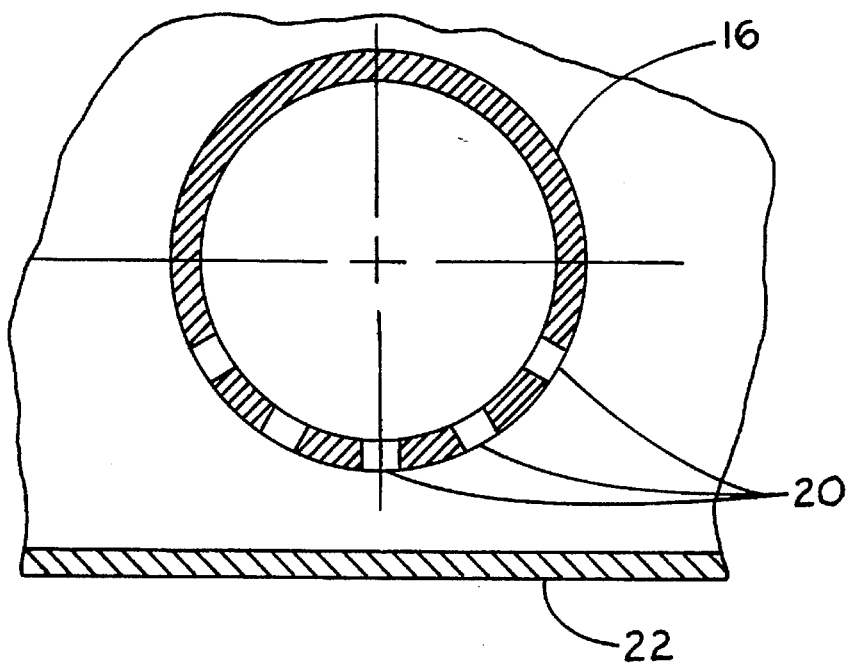
FIG. 4 is a sectional view of the pipe taken on Line 4—4 in FIG. 2.

A cooling and filtration apparatus illustrated generally at 10 includes a housing 11 that has a lower inlet chamber 12 filled with a suitable liquid such as water, and has an outlet chamber 14. The outlet chamber has an outlet opening or tube 15, to carry gas out of the housing 11. The inlet chamber has an inlet pipe or tube 16 therein connected to an inlet opening 18 that is connected to diesel exhaust or other source of gases 17. The tube or pipe 16 has a closed inner end and as shown in FIG. 3, has a series of perforations or apertures indicated at 20 in the wall thereof. Preferably these apertures are directed downwardly in the inlet chamber 12 toward a bottom wall 22 of the housing. The apertures 20 thus are on the lower half of the cylindrical tube 16, and gas will be discharged downwardly into the liquid in the inlet chamber 12 of housing 11. The gas then bubbles into the liquid and the bubbles rise. The inlet chamber has a screen assembly or perforated panel assembly indicated generally at 24 that is used for breaking up larger bubbles into smaller ones. As the bubbles rise from the pipe 16 in the water, they tend to coalesce to form larger bubbles. Large bubbles will rise quickly, reducing the time available for heat to be transferred from the hot exhaust into the surrounding water or liquid. The perforated panel is used for breaking up these bubbles into finer bubbles as shown in FIG. 2. The smaller bubbles are illustrated at 26 and larger bubbles are shown at 25.

The perforated panel assembly 24 generally comprises one or more perforated plates 28, that as shown are stacked vertically and held in the housing with suitable fasteners. These perforated plates 28 have openings 27 that are of fairly substantial size, usually in the range between 1/16 inch to 3/4 inch in diameter. In order to improve the efficiency of the bubble break up process, additional layers of fibrous pads indicated generally at 30 can be placed between the porous plates, as desired. The fibers are usually fairly large in diameter, being between 0.001 inch to 0.050 inches. Coarser fibers can be used when the demand for cooling is not so great and the bubbles do not have to be broken up so much. The porosity of the plates 28 and the number of layers 30 of fibers, as well as the fiber size and density is selected to control the size of the exiting bubbles 26. The larger bubbles are shown at 25, in FIG. 2 below the porous layer 24.

The liquid filled inlet chamber 12 makes a highly efficient exhaust gas cooler, and the diesel exhaust exiting the pipe 16 in the form of bubbles is cooled by evaporative cooling as it bubbles through the water or other liquid. The smaller bubbles 26 provide for a more efficient heat transfer, and even in a short distance a very efficient cooling takes place, and is capable of cooling the hot diesel exhaust gases from a high temperature to a low temperature in a short distance.

Figure 1:
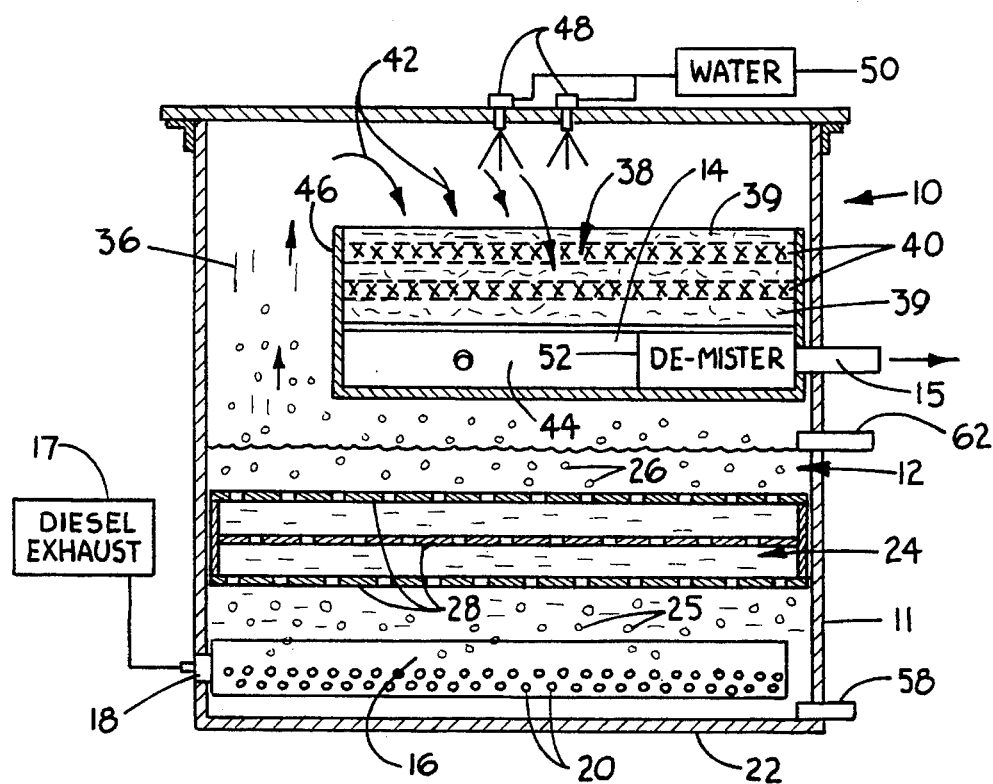
FIG. 1 is a schematic side sectional view of an air and gas cooling infiltration apparatus made according to the present invention.

As the bubbles 26 reach the water surface, they burst out generally as shown in FIG. 2 and will form a mist and the mist is carried along with the gas into the upper outlet chamber through a passage 36, (FIG. 1) and then through a suitable filter 38 into the outlet chamber 14. The filter 38 is a fibrous material filter that can be formed in several layers if desired. Filter layers of different fiber size can be used as schematically shown in FIG. 1 at 39 and 40. The fibers in each of the outlet filter layers 39 and 40 can be conventional fibers, including glass, organic, mineral or metal fibers. The filter can have a number of other configurations. For example, configurations shown in my prior application Ser. No. 08/089,942 mentioned above.

The amount of mist carried by the gas as it enters the outlet filter, as shown schematically by the arrows 42, is such that the fibers in the filter 38 will be wetted by the mist, and the water or other liquid coating the fibers will prevent particulate contaminants in the diesel or other exhaust gas from adhering tightly to the fibers.

The volume of the exhaust gas can be measured in relation to the size of the housing 10, the porous layer submerged in the water, and the size of the filter 38 such that the mist carried by the gas will be sufficient to maintain the fibers in a wetted condition. Excess liquid will drain from the fibers down into a chamber indicated at 44 inside a filter housing 46 that is separated from the gas passage 36 and the inlet chamber. The housing 46 can be periodically drained, and also the filter 38 can be flushed if desired by utilizing spray nozzles, if necessary in the top wall of the housing 11. Spray nozzles are indicated schematically at 48, connected to a pressurized water source 50 through suitable valves.

Because the gas exiting the filter 38 into the outlet chamber 14 will be cool and clean but still may have some mist carried with it, a conventional demister, or mist eliminator indicated at 52 is provided at the outlet opening 15 so that cool, clean exhaust gas is discharged out of the outlet opening 15.

The inlet pipe 16 can be made of any desired materials that are not adversely affected by the liquid being used or by the diesel exhaust. The openings or perforations in the pipe 16 are preferably in the range of 3/8 of an inch in diameter. Again, the openings are preferably directed downwardly as shown in FIG. 5.

The outlet filter 38 can be a uniform fibrous mat, and it can be of selected fine material that is known in the trade for eliminating small particles. It does not have to have separating layers as illustrated in FIG. 2, the filter can take the form of tubes, flat layers as shown, or bag filters could be used.

The perforated panel assembly 24 is selected to be relatively coarse. The panel assembly 24 is positioned to insure that the bubbles in the water pass through the submerged perforated panel. The perforated panel assembly 24 has to be capable of permitting water to drain through it and that is essentially the only limitation on the size of the opening or pores of the panel. Thus, porous screens or materials can be used.

The perforated panel assembly 24 does not have to be fully submerged to fulfill its function of cooling and the action of breaking up the bubbles and causing a mist to be formed. If the panel assembly is only partially submerged, the efficiency is less. It is preferable that the liquid level in the inlet chamber 12 be above the perforated panel so that the bubbles bursting from the surface create an adequate mist for keeping the outlet filter 38 wetted satisfactorily.

The above described invention is a combined diesel exhaust cooler, and a continuously self-cleaning filter. The combination of the exhaust cooling function with the filtration function into a single unit makes the overall apparatus more compact than when the functions are separated, and by using the bubbling process to cool the exhaust gas and produce the water droplets to wet the outlet filter, it is possible to eliminate any spray nozzles that would be used for wetting the outlet filter.

The continuous wetting of the filter is such that the particles will be drained or flushed off the fibers by the liquid, and can then be drained or flushed away in a suitable manner. A continuously self cleaning filtration device is thus provided.

The water level in the inlet chamber can be maintained by having a suitable inlet pipe 62 and outlet pipe 58 together with a float valve (not shown). The water can be circulated and replaced with cool water to insure that it provides adequate cooling action for the exhaust.

Although the present invention has been described with reference to preferred embodiments, workers skilled in the art will recognize that changes may be made in form and detail without departing from the spirit and scope of the invention.

What is claimed is:

1. Apparatus for cooling exhaust gases, comprising:

a housing having an inlet for allowing gas to enter an inlet chamber, and an outlet for allowing gas to exit an outlet chamber, wherein the gas flows from the inlet chamber to the outlet chamber, the inlet chamber having a filling of liquid therein to a desired level;

a perforated member at least partially submerged in the liquid, the gas entering the inlet chamber at a level below the perforated member, the perforated member being positioned at a portion of an inlet chamber relative to the gas inlet such that gas passes only through the liquid and the perforated member prior to reaching the outlet chamber after entering the inlet chamber at the inlet; and wherein the inlet comprises a hollow gas carrying tube extending into the inlet chamber and submerged in the liquid, the hollow gas carrying tube having openings directly through a wall thereof at a location such that the gas entering the inlet flows directly into the liquid, said hollow gas carrying tube having perforations facing in a direction generally opposite from the perforated member such that gas has to initially move in a direction away from the perforated member and then toward and through the perforated member to reach the outlet chamber, said perforated member having openings such that bubbles of the gas are reduced in size and the bubbles pass through the perforated member; and a filter member in said outlet chamber above the level of liquid in the inlet chamber for filtering gas as it passes to the outlet, the outlet chamber having an generally a closed bottom wall an inlet positioned such that gas moving to the outlet has to move above the filter and turn to enter the outlet chamber before passing through the filter.

2. The apparatus of claim 1 wherein the perforated member comprises at least one perforated plate through which gas passes.

3. The apparatus of claim 2 wherein said perforated member comprises a filling of fibrous material supported on said perforated plate on a side of said perforated plate opposite from the tube.

4. The apparatus of claim 1 wherein said liquid level is maintained such that as gas bubbles to the surface of the liquid to enter the outlet chamber, the liquid forms a mist which is carried with the flow of gas into the outlet filter in sufficient quantities to wet fibrous material forming the outlet filter.

5. The apparatus of claim 4 wherein said filter is carried in a filter housing and wherein the fibers in the filter in the outlet chamber drain into the filter housing, and a drain to drain water from the filter housing.

6. An apparatus for filtering particulate contaminants from exhaust and other gasses, the apparatus comprising a housing having an inlet for allowing gas to enter an inlet chamber and an outlet for allowing gas to exit an outlet chamber, wherein the gas flows from the inlet chamber to the outlet chamber;

a filter contained in the housing between the inlet chamber and the outlet chamber such that the gas flows through the filter;

a tube submerged in the liquid and having outlet openings for gas flow into the inlet chamber;

a filling of liquid in the inlet chamber above the tube through which gas passes prior to entering the filter as gas flows from the inlet to the outlet, the gas bubbling freely through the outlet openings of the tube into the liquid, the gas bubbles forming a mist as they exit the liquid, which mist is carried by the gas to the filter to wet the filter and maintain the filter in a wetted condition to reduce adherence of particles to the filter; and a second housing for said filter, said second housing being positioned within the first mentioned housing above the liquid and having an opening on a top side forming the sole inlet to the second housing, the gas passing through the liquid thereby being forced to turn downwardly to pass through the filter, the second housing including a lower chamber that collects water draining off the filter.

7. The apparatus of claim 6 and a gas transmitting panel between the inlet and filter through which gas passes as it moves from the inlet to the outlet.

8. The apparatus of claim 6 wherein the liquid is water and a perforated panel is submerged in water in the inlet chamber and wherein gas bubbles through the perforated panel and water as the gas moves from the inlet to the outlet chamber.

9. The apparatus of claim 8 wherein said perforated panel comprises a perforated plate.

10. The apparatus of claim 9 and a layer of fibrous materials supported on the perforated plate to provide passage openings for gas of desired size as the gas bubbles through the water in the inlet chamber.

11. The apparatus of claim 6 and a demister between the filter and the outlet for removing mist from gas passing through the outlet.

12. The apparatus of claim 6, wherein the second housing is positioned adjacent a sidewall of the first mentioned housing, said second housing restricting the size of the passage of the inlet chamber to the filter housing, such that the gas flowing into the open top filter housing moves around an exterior of at least a portion of the second housing between the inlet and the outlet.

* * * * *

UNITED STATES PATENT AND TRADEMARK OFFICE
CERTIFICATE OF CORRECTION

PATENT NO.  : 5,453,107
DATED       : September 26, 1995
INVENTOR(S) : Benjamin Y.H. Liu It is certified that error appears in the above-indentified patent and that said Letters Patent is hereby corrected as shown below:

Col. 6, line 3, please change "gasses" to
--gases--; and

Col. 6, line 40, after "of" insert --a--.

Signed and Sealed this

Sixteenth Day of January, 1996

Attest:

BRUCE LEHMAN

*Attesting Officer*    *Commissioner of Patents and Trademarks*